G. H. FORSYTH.
SPARE TIRE CARRIER.
APPLICATION FILED JULY 12, 1920.
1,422,094.
Patented July 11, 1922.
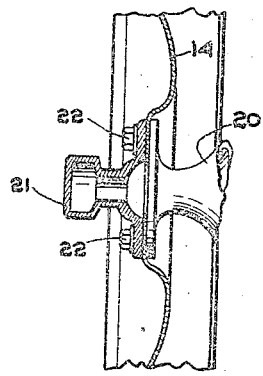
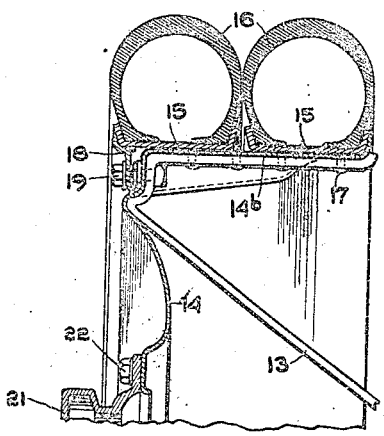
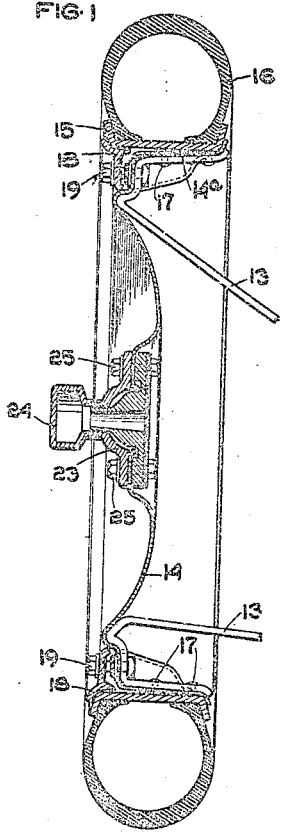
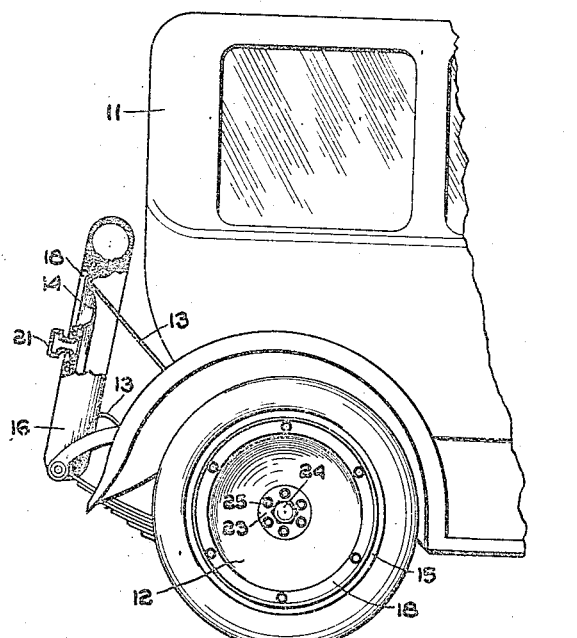
WITNESS:
Raymond L. Grist
INVENTOR
GEORGE H. FORSYTH
BY Cromwell, Grist & Wardell
ATTORNEYS

UNITED STATES PATENT OFFICE.

GEORGE H. FORSYTH, OF CHICAGO, ILLINOIS.

SPARE-TIRE CARRIER.

1,422,094.

Specification of Letters Patent.  Patented July 11, 1922.

Application filed July 12, 1920. Serial No. 395,466.

*To all whom it may concern:*

Be it known that I, GEORGE H. FORSYTH, a citizen of the United States, residing at Chicago, in the county of Cook and State of Illinois, have invented certain new and useful Improvements in Spare-Tire Carriers, of which the following is a specification.

The invention has in view the provision of a holder for spare tires which shall securely support the tires or demountable rims carrying tires in such manner as to guard against loss and to prevent distortion or collapsing of the rims; which shall simulate in appearance and supporting function a complete wheel of the type in use on the car; which shall be economical in construction due to the employment for the wheel body of cheaper material than used in regular wheel construction; and which yet may include supplemental parts of standard construction such as the rim-retaining ring, the hub, etc., available in case of emergency for replacement on service wheel parts lost or broken.

Aside from the practical advantages, the employment of such a "dummy wheel" as a tire carrier, gives the ocular impression of a fifth wheel carried as a spare rather than a mere tire carrier.

In order that the invention may be readily understood I have set forth, by way of illustration, in the accompanying drawing and in the following detailed description based thereon, preferred and optional embodiments of the same in "dummy" wheels of the disk steel type.

In the drawings,

Fig. 1 is a central vertical section through a preferred embodiment of the invention;

Fig. 2 is a similar section, fragmentary in character, of a modification;

Fig. 3 is a longitudinal vertical section through the upper half of a tire carrier adapted for the support of two tires; and Fig. 4 is a fragmentary view of a car in side elevation equipped with steel disk wheels and with a tire carrier embodying the invention, the carrier being shown partially in section.

Having particular reference to the drawings, by way of illustration, the car 11 of Fig. 4, being equipped with steel disk wheels 12, is provided with a spare tire carrier representing a dummy wheel of the same disk steel type. The carrier is attached to the car by brace bracket rods or strips 13.

In the manufacture of disk steel wheels it is necessary to employ for the body portion of the wheel sheet steel of comparatively heavy gauge and of good quality. The quality of the material employed and difficulty of properly shaping the same entails considerable cost of manufacture. Where wire wheels are employed on a car, it has been customary to carry a fifth service wheel having a tire thereon instead of spare tires upon a carrier, but due to the cost of disk steel wheels, an extra fifth or sixth wheel would be a luxury to be afforded by comparatively few persons. Moreover, the weight of one or more spare service wheels added to the load of the car is a considerable item, as is also the labor of changing wheels in case of a puncture.

According to the present invention the spare tire carrier comprises a dummy wheel body 14 having the same contour as the service wheel but preferably made of light gauge cheap metal. This dummy wheel body includes also a peripheral felly portion 14ª, the contour of the body portions 14 and 14ª corresponding identically in configuration with the corresponding portions of the service wheel. As in the case of the latter, the felly of the dummy wheel is adapted to receive and support a demountable rim 15 carrying a tire 16, the metal of the body being reinforced, preferably, by bending the outer portions of the brace rods 13 to correspond to the configuration of the wheel and by riveting the rods to the felly as indicated at 17; whereby, also, the dummy wheel is permanently assembled with the car.

As in the case of a service wheel, the demountable rim 15 is held in place upon the felly by means of a tire-retaining member 18 which is adjustable by means of the bolts 19 to wedge and retain the demountable rim upon the felly. If spaced shims were employed upon the service wheel of the car, as is done in the ordinary wood wheel of the artillery type, corresponding tire-retaining shims would be employed upon the carrier. This tire-retaining member may be of comparatively light weight but, preferably, it is not only of standard appearance but of standard construction so that in case of injury to one or more of the tire-retaining members on the service tires of the car, it may be detached and used as a replacement service part.

In Fig. 2 of the drawing, a thimble bracket 20 is illustrated as a substitute for the brace rods 13 of Fig. 1. In said view the thimble bracket is shown as permanently associated with the dummy disk body 14 as by welding or riveting, while the hub 21 of dummy character but of standard appearance is likewise permanently associated therewith, false or dummy bolts 22 being employed to carry out the appearance of actuality.

In Fig. 1, on the other hand, a service hub 23 and cap 24 are employed which are of standard construction, removably associated with the dummy disk 14 by means of bolts 25. In the latter form of construction, in case of injury to the hub or hub cap of one of the service wheels, the corresponding part or parts may be removed from the tire carrier and used as replacement parts in case of emergency.

In Fig. 3 a similar form of construction is shown modified, however, to the extent that a felly 14$^b$ of double width is employed whereby to support side by side two demountable rims 15 and tires 16. A single tire-retaining ring 18 suffices to hold the two spares in place upon the carrier and in use the device has every appearance of comprising two complete service wheels carried at the rear of the car.

It will thus be observed that by my invention I attain all the objects and advantages of spare tire carriers hitherto employed, and, in addition, impart to the car the appearance of being equipped with one or more service wheels carried as spares, and at an expense commensurate with that usually involved with the employment of a mere spare tire carrier. Furthermore, I provide a reserve supply of tire-retaining rings and hubs available in case of emergency for replacement purposes upon the service wheels of the car.

I claim:

1. A carrier for spare tires comprising a dummy wheel body, simulating in appearance a service wheel of the car on which used but of non-service construction, a member adapted to receive and support a spare tire, and a releasable tire-retaining member, the dummy wheel body permanently assembled with a suitable support.

2. A carrier for spare tires comprising a dummy disk wheel body simulating in apperance a service wheel of the car on which used but of non-service construction, a member adapted to receive and support a spare tire, a releasable tire-retaining ring, and a hub, the wheel body permanently attached to the car on which it is carried.

3. A carrier comprising a dummy wheel body, simulating in appearance a service wheel of the car on which used but of non-service construction, a member adapted to receive and support a spare tire, a releasable tire-retaining member, and a hub, the whole of standard appearance, said carrier being permanently assembled with a suitable support.

4. A carrier for spare tires comprising a wheel body, a member adapted to receive and support a spare tire, and a releasable tire-retaining member, the wheel body permanently assembled with a suitable support and a portion of said carrier detachable for emergency use in connection with a service wheel of the car.

5. A carrier for spare tires comprising a disk wheel body having a felly portion adapted to receive and support a spare tire, a releasable tire-retaining member, and a hub, the wheel body fixedly attached to the car on which it is carried and a portion of said carrier detachable for emergency use in connection with a service wheel of the car.

6. A carrier comprising a dummy wheel body of light weight non-service material, a felly member adapted to receive and support a spare tire, an adjustable tire-retaining member, and a hub, the hub and tire-retaining member as well as the wheel body being of standard service appearance, said carrier being fixedly assembled with a car and a portion of said carrier detachable for emergency service use on the car.

7. A carrier for spare tires comprising a dummy disk wheel body permanently assembled with a car, a felly adapted to receive and support a tire-carrying demountable rim, and a tire-retaining member, the tire-retaining member of standard service construction and detachable for emergency use.

8. A carrier comprising a dummy wheel body having a felly portion adapted to receive and support a spare tire, an adjustable tire-retaining member, and a hub, the hub and tire-retaining member being of standard construction and detachable for emergency use on a service wheel of the car, and the wheel body permanently assembled with the car.

9. A carrier for spare tires comprising a dummy disk wheel body of light weight sheet metal having a felly portion adapted to receive and support a spare tire, an adjustable tire-retaining ring, and a hub, the hub being of standard appearance, the tire-retaining ring being of standard construction detachable for emergency use on a service wheel of the car, and the wheel body permanently assembled with the car.

10. A carrier for spare tires comprising a dummy disk wheel body of light weight sheet metal having a felly portion adapted to receive and support a spare tire, an adjustable tire-retaining ring, and a hub, the tire-retaining ring being of standard appearance and construction, the hub being of standard construction detachable for emergency use on a service wheel of the car, and the wheel body permanently assembled with the car.

11. A carrier for spare tires comprising a dummy disk wheel body simulating in appearance a service wheel of the car on which used but of non-service material having a felly portion adapted to receive and support a plurality of spare tires side by side, and an adjustable tire-retaining ring, the tire-retaining ring being of standard appearance and the dummy body being permanently assembled with the car on which it is carried.

12. A carrier for spare tires comprising a dummy disk wheel body of light weight sheet metal having a felly portion adapted to receive and support a plurality of spare tires side by side, an adjustable tire-retaining ring, and a hub, the hub and tire-retaining ring being of standard appearance and construction and detachable for emergency use on a service wheel of the car, and the dummy body permanently assembled with the car.

In witness whereof I have hereunto signed my name in the presence of two subscribing witnesses.

GEORGE H. FORSYTH.

Witnesses:
 RAYMOND L. GREIST.
 LEWIS T. GREIST.